United States Patent
Kennewick

(10) Patent No.: US 11,935,521 B2
(45) Date of Patent: Mar. 19, 2024

(54) REAL-TIME FEEDBACK FOR EFFICIENT DIALOG PROCESSING

(71) Applicant: Oracle International Corporation, Redwood Shores, CA (US)

(72) Inventor: Michael Richard Kennewick, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 309 days.

(21) Appl. No.: 16/941,051

(22) Filed: Jul. 28, 2020

(65) Prior Publication Data

US 2021/0082412 A1 Mar. 18, 2021

Related U.S. Application Data

(60) Provisional application No. 62/899,641, filed on Sep. 12, 2019.

(51) Int. Cl.
*G10L 15/18* (2013.01)
*G10L 13/08* (2013.01)
*G10L 15/26* (2006.01)

(52) U.S. Cl.
CPC .......... *G10L 15/1822* (2013.01); *G10L 13/08* (2013.01); *G10L 15/1815* (2013.01); *G10L 15/26* (2013.01)

(58) Field of Classification Search
CPC . G10L 15/1822; G10L 13/08; G10L 15/1815; G10L 15/26; G10L 2015/221; G10L 15/22; G10L 15/063; G10L 15/16; G10L 2015/0638; G10L 2015/223;

(Continued)

(56) References Cited

U.S. PATENT DOCUMENTS 10,521,189 B1 * 12/2019 Ryabov ................. G06F 40/117
2018/0330730 A1 * 11/2018 Garg .................... G10L 15/1815
2020/0143798 A1 * 5/2020 Kim ........................ G10L 15/30

(Continued)

OTHER PUBLICATIONS

Lugosh et al., *Speech Model Pre-training for End-to-End Spoken Language Understanding* (https://arxiv.org/pdf/1904.03670.pdf), published Jul. 25, 2019, 5 pp.

(Continued)

*Primary Examiner* — Daniel C Washburn
*Assistant Examiner* — Athar N Pasha
(74) *Attorney, Agent, or Firm* — Kilpatrick Townsend & Stockton LLP

(57) ABSTRACT

Techniques are described for improving the efficiency of dialog processing by prompting and processing user feedback substantially in real time. A dialog system receives speech input from a user and processes a first portion of the speech input to determine an initial discerned intent. The dialog system causes display of a visual indication of the initial discerned intent. The visual indication of the discerned intent is used to guide the dialog so that the user can correct or confirm the initial discerned intent in a natural fashion. If the initial discerned intent is inaccurate, the user can provide feedback correcting the dialog system, and the dialog system processes a second portion of the speech input to determine a modified discerned intent. Thus, the dialog system can use the feedback to correct misunderstandings on the fly.

17 Claims, 8 Drawing Sheets

(58) Field of Classification Search
CPC .... G06F 40/30; G06K 9/6267; G06N 3/0454; G06N 3/049; G06N 3/08
See application file for complete search history.

(56) References Cited

U.S. PATENT DOCUMENTS

2020/0151254 A1* 5/2020 Wohlwend .............. G10L 15/16
2020/0327890 A1* 10/2020 Saito ....................... G10L 15/07
2021/0358502 A1* 11/2021 Kim ...................... G10L 15/063

OTHER PUBLICATIONS

Haghani et al., *From Audio to Semantics: Approaches to end-to-end spoken language understanding* (https://arxiv.org/abs/1809.09190), published Sep. 24, 2018, 7 pp.
K. Sreelakshmi et al., Deep Bi-Directional LSTM Network for Query Intent Detection, 8th International Conference on Advances in Computing & Communications (ICACC-2018), Rajkumar Buyy and, Sherly K.K, eds. (2018); Procedia Computer Science 143, pp. 939-946; www.sciencedirect.com.
Devlin, Jacob; Chang, Ming-Wei; Lee, Kenton; Toutanova, Kristina, "BERT: Pre-training of Deep Bidirectional Transformers for Language Understanding". arXiv:1810.04805v2, published May 24, 2018, 16 pp.

* cited by examiner

REAL-TIME FEEDBACK FOR EFFICIENT DIALOG PROCESSING

CROSS-REFERENCE TO RELATED APPLICATIONS

The present application claims the benefit and priority under 35 U.S.C. 119(e) of U.S. Application No. 62/899,641, filed on Sep. 12, 2019, entitled "IMPROVING COGNITIVE UNDERSTANDING IN A DIALOG SYSTEM USING USER FEEDBACK," the content of which is herein incorporated by reference in its entirety for all purposes.

TECHNICAL FIELD

The present disclosure relates generally to dialog systems. More specifically, but not by way of limitation, this disclosure describes techniques for improving the experience and efficiency of dialog processing by providing visual cues for guiding a dialog.

BACKGROUND

An increasing number of devices now enable users to interact with the devices directly using voice or spoken speech. For example, a user can speak to such a device in a natural language where the user may ask a question or make a statement requesting some action to be performed. In response, the device performs the requested action or responds to the user's question using voice output. Since interacting directly using voice is a more natural and intuitive way for humans to communicate with their surroundings, the popularity of such speech-based systems is growing at an astronomical rate.

In conventional systems, a conversation between a user and a dialog system can be lengthy and frustrating when the dialog system misinterprets the meaning of a received utterance. Conventional dialog systems operate as a series of transactions rather than a continuous flow. For example, a user pushes a button, says a sentence, the dialog system determines and provides a response, and the dialog ends. If the dialog system improperly interprets the meaning of the sentence, then the dialog system may return an incorrect response, then have to start a new session and enter into a back-and-forth with the user until the correct meaning is determined.

BRIEF SUMMARY

The present disclosure relates generally to dialog systems. More particularly, techniques are described techniques for improving the experience and efficiency of dialog processing by providing visual cues for guiding a dialog. Various embodiments are described herein, including methods, systems, non-transitory computer-readable storage media storing programs, code, or instructions executable by one or more processors, and the like.

In certain embodiments, a dialog system receives speech input from a user. The dialog system processes a first portion of the speech input to determine an initial discerned intent. The dialog system causes display of a visual indication of the initial discerned intent. The dialog system processes a second portion of the speech input to determine a modified discerned intent, wherein the second portion of speech input corrects the initial discerned intent responsive to the visual indication of the initial discerned intent.

In some aspects, the dialog system processes the speech input substantially in real time. In some aspects, the visual indication comprises one or more of: text specifying a domain associated with the discerned intent, text specifying the discerned intent, an image indicating the domain associated with the discerned intent, or an image indicating the discerned intent.

In some aspects, the method further includes executing, by the dialog system, a task corresponding to the modified discerned intent. In some aspects, the method further includes determining, by the dialog system, a response based upon the modified discerned intent and providing, by the dialog system, the response to the user.

In some aspects, determining the initial discerned intent comprises computing, by the dialog system, a plurality of scores for a respective plurality of potential intents and the first portion of the speech input and determining, by the dialog system, that the score for a particular intent, of the plurality of potential intents, exceeds a threshold value, thereby setting the particular intent to the initial discerned intent, wherein causing display of the visual indication of the initial discerned intent is triggered by the determination that the score exceeds the threshold value.

In some aspects, determining the initial discerned intent comprises determining, by an automated speech recognition subsystem of the dialog system, a first text utterance corresponding to the first portion of the speech input, providing, by the automated speech recognition subsystem to a natural language understanding subsystem of the dialog system, the first text utterance, and determining, by the natural language understanding subsystem based upon the first text utterance, the initial discerned intent.

Embodiments further include systems and computer-readable media (e.g., a non-transitory computer-readable memory) configured for performing the methods described herein.

The foregoing, together with other features and embodiments will become more apparent upon referring to the following specification, claims, and accompanying drawings.

DETAILED DESCRIPTION

Figure 1:
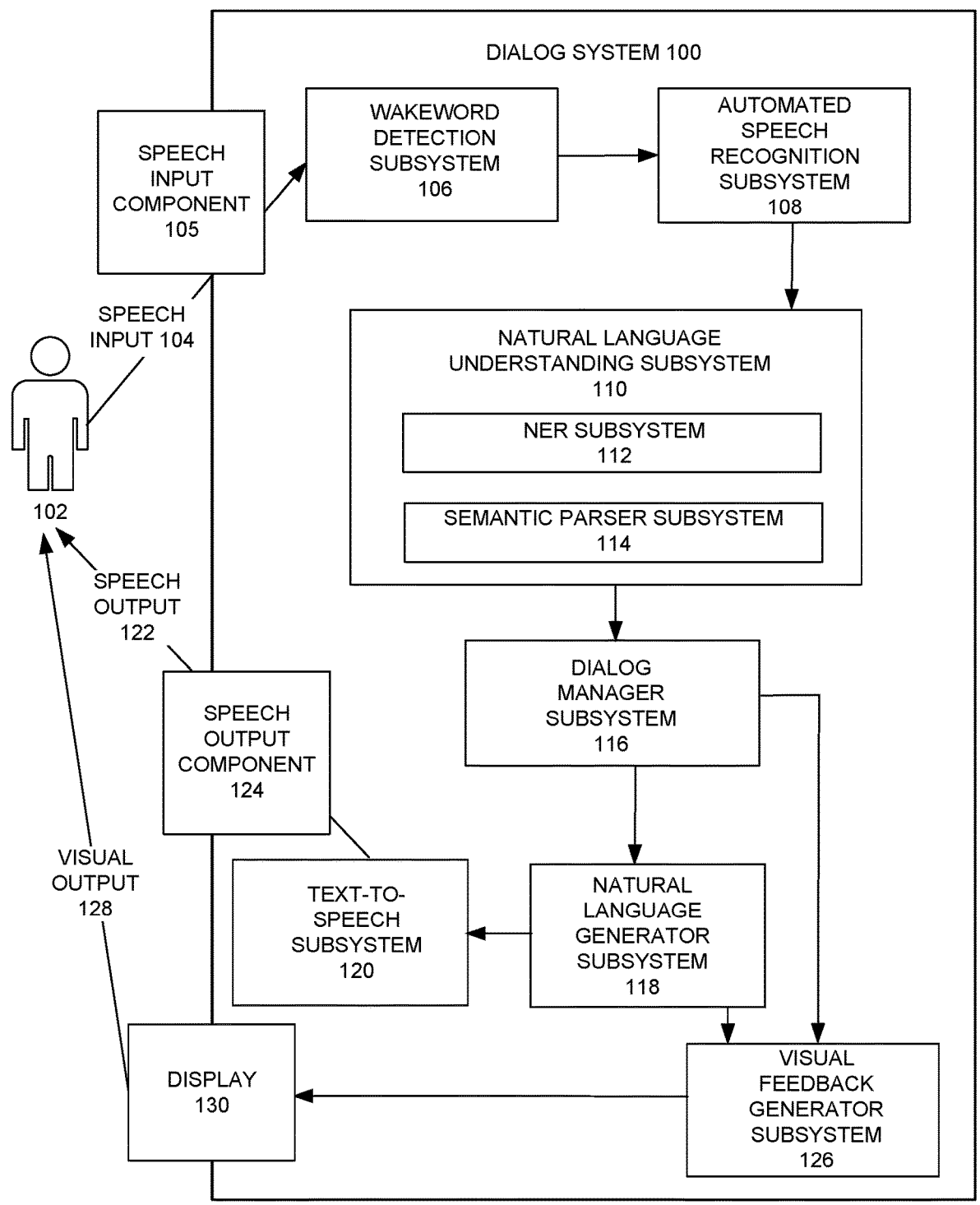
FIG. 1 is a simplified block diagram depicting a dialog system according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as exemplary is not necessarily to be construed as preferred or advantageous over other embodiments or designs.

A voice-enabled system that is capable of having a dialog with a user via voice inputs and voice outputs can come in various forms. For example, such a system may be provided as a stand-alone device, as a digital or virtual assistant, as a voice-capable service, and the like. In each of these forms, the system is capable of receiving voice or speech inputs, understanding the inputs, generating responses or taking actions responsive to the inputs, and outputting the responses using voice outputs. In certain embodiments, the dialog functionality in such a voice-enabled system is provided by a dialog system or infrastructure ("dialog system").

As noted above, in conventional systems, a conversation between a user and a dialog system can be lengthy and frustrating due to issues with cognitive understanding and the overall flow of the dialog processing. For example, typically, a dialog system will process an entire question or sentence, including determining a user intent, and return a response. If the dialog system improperly discerns the user's intent, the dialog system may return an incorrect response, then enter into a back-and-forth with the user as the user attempts to clarify the query. This generally requires starting a new dialog session—e.g., the dialog system will return a wrong answer and terminate the dialog session, and the user will have to initiate a new dialog session, attempting to correct the misunderstanding. In addition to frustrating the user, the longer it takes to address the user's query, the more processing time and computing resources are expended.

The present disclosure describes techniques for reducing the amount of user interaction, time, memory, and processing resources used by a dialog system by providing real-time feedback associated with user input in real-time. For example, the dialog system can process a partial utterance, sentence, or question to determine an initial discerned intent while the user is still speaking. The system returns a visual indication of the initial discerned intent as the user continues to speak. This way, the user can provide clarification or change course while continuing to speak. This eliminates the memory required to initiate a new session, and the reduces the processing power required to process multiple inputs and outputs resulting from providing an incorrect response. These efficiencies also improve the user experience.

Dialog processing may involve detecting a domain of an utterance and/or classifying the intent of the utterance. A domain is a category for the utterance—for example, Travel, Weather, and Music are domains. An intent for an utterance identifies an objective of the utterance (e.g., an action that a user is requesting to be performed). Examples of intents include Order_Pizza and Find_Directions. A given domain may correspond to multiple intents—For example, in the Travel domain, an utterance may be classified with an intent selected from Book_Flight, Upgrade_Seat, Request_Car, and so forth.

Domain and intent classification are each operations executed relatively early in the dialog processing pipeline, and, thus, it is beneficial to display an indication of the initial discerned intent and/or domain to improve cognitive understanding in the dialog system. By providing an indication of an initial discerned intent and/or domain relatively early in a dialog, the dialog system can prompt and process user utterances in a guided manner to ensure that the dialog system is working with the correct domain and/or intent.

In some embodiments, the dialog system continuously presents its understanding of context as the user speaks one or more sentences. The user feedback can be through words, pictures, or through natural language generation. For example the dialog system detects user input including the words "John Howie," and determines with some certainty that John Howie is a contact (e.g., the system determines a discerned user intent to retrieve contact information). The dialog system may show a list of all "Johns" in the user's contacts on a screen. Upon the receipt of additional information later in the utterance or through the next sentence, the dialog system may then reevaluate the request. For example, the user may correct the system by continuing to speak and say, "No, I am talking about the steak house." This may result in the dialog system modifying the discerned intent one related to identifying information about a restaurant. The cue provided by the dialog system allows the user to see that the system might misunderstand them. The user can then adjust their utterance midstream, such that the dialog system is able to provide further information seamlessly. By leveraging real-time processing to indicate the discerned intent mid-stream, the dialog system prompts the user to provide clarification or correction when required, without having to stop and start the dialog.

FIG. 1 illustrates an example of a dialog system 100, according to some embodiments. The dialog system 100 is a specialized computing system that may be used for processing large amounts of data using a large number of computer processing cycles. The numbers of devices depicted in FIG. 1 are provided for illustrative purposes. Different numbers of devices may be used. For example, while each device, server, and system in FIG. 1 is shown as a single device, multiple devices may instead be used.

The dialog system 100 is configured to receive voice or speech inputs 104 (also referred to as speech utterances) from a user 102. The dialog system 100 may then interpret the voice inputs. The dialog system 100 may maintain a dialog with the user 102, and possibly perform or cause one or more actions to be performed based upon interpretations of the voice inputs. The dialog system 100 may prepare appropriate responses, and output the responses to the user using voice or speech output 122. The dialog system 100 may further prepare and output visual output 128.

In certain embodiments, the processing performed by a dialog system is implemented by a pipeline of components or subsystems, including a speech input component 105, a wake-word detection (WD) subsystem 106, an automatic speech recognition (ASR) subsystem 108, a natural language understanding (NLU) subsystem 110, which includes a named entity recognizer (NER) subsystem 112 and a semantic parser subsystem 114, a dialog manager (DM) subsystem 116, a natural language generator (NLG) subsystem 118, a text-to-speech (TTS) subsystem 120, a speech output component 124, a visual feedback generator subsystem 126, and a display 130. The subsystems listed above may be implemented only in software (e.g., using code, program, or instructions executable by one or more processors or cores), in hardware, or in a combination of hardware and software. In certain implementations, one or more of the subsystems may be combined into a single subsystem. Additionally or alternatively, in some implementations, the functions described herein as performed by a particular subsystem may be implemented by multiple subsystems.

The speech input component 105 includes hardware and software configured to receive speech input 104. In some instances, the speech input component 105 may be part of the dialog system 100. In some other instances, the speech input component 105 may be separate from and be communicatively coupled to the dialog system 100. The speech input component 105 may, for example, include a microphone coupled to software configured to digitize and transmit speech input to the wake-word detection subsystem 106.

The wake-word detection (WD) subsystem 106 is configured to listen for and monitor a stream of audio input for input corresponding to a special sound or word or set of words (referred to as a wake-word). Upon detecting the wake-word configured for the dialog system 100, the WD subsystem 106 is configured to activate the ASR subsystem 108. In certain implementations, a user may be provided the ability to activate or deactivate the WD subsystem 106 (e.g., by speaking the wake-word pushing a button). When activated (or operating in active mode), the WD subsystem 106 is configured to continuously receive an audio input stream, and process the audio input stream to identify audio or voice input corresponding to the wake-word. When audio input corresponding to the wake-word is detected, the WD subsystem 106 activates the ASR subsystem 108.

As described above, the WD subsystem 106 activates the ASR subsystem 108. In some implementations of the voice-enabled system, mechanisms other than wake-words may be used to trigger or activate the ASR subsystem 108. For example, in some implementations, a push button on a device may be used to trigger the ASR subsystem 108 processing without needing a wake-word. In such implementations, the WD subsystem 106 may not be provided. When the push button is pressed or activated, the speech input received after the button activation is provided to the ASR subsystem 108 for processing. In some implementations, the ASR subsystem 108 may be activated upon receiving an input to be processed.

The ASR subsystem 108 is configured to receive and monitor spoken voice input after a trigger or wake-up signal (e.g., the wake-up signal may be sent by the WD subsystem 106 upon the detection of a wake-word in the speech input, the wake-up signal may be received upon the activation of a button, etc.) and to convert the voice input to text. As part of its processing, the ASR subsystem 108 performs speech to text conversion. The spoken speech or voice input may be in a natural language form, and the ASR subsystem 108 is configured to generate the corresponding natural language text in the language of the speech input. The text generated by the ASR subsystem is then fed to the NLU subsystem 110 for further processing. The voice input received by the ASR subsystem 108 may include one or more words, phrases, clauses, sentences, questions etc. The ASR subsystem 108 is configured to generate a text utterance for each spoken clause and feed the text utterances to the NLU subsystem 110 for further processing.

The NLU subsystem 110 receives texts generated by the ASR subsystem 108. The texts received by the NLU subsystem 110 from the ASR subsystem 108 may include text utterances corresponding to spoken words, phrases, clauses, etc. The NLU subsystem 110 translates each text utterance (or a series of text utterances) to its corresponding logical form. In certain implementations, the NLU subsystem 110 includes a named entity recognizer (NER) subsystem 112 and a semantic parser (SP) subsystem 114. The NER subsystem 112 receives a text utterance as input, identifies named entities in the text utterance, and tags the text utterance with information related to the identified named entities. The tagged text utterances are then fed to the SP subsystem 114, which is configured to generate a logical form for each tagged text utterance (or for a series of tagged text utterances). The logical form generated for an utterance may identify one or more intents corresponding to the text utterance. An intent for an utterance identifies an objective of the utterance. Examples of intents include "order pizza" and "find directions." An intent may, for example, identify an action that is requested to be performed. In addition to intents, a logical form generated for a text utterance may also identify slots (also referred to as parameters or arguments) for the identified intent. For example, for the speech input "I'd like to order a large pepperoni pizza with mushrooms and olives," the NLU subsystem 100 can identify the intent Order_Pizza. The NLU subsystem can also identify and fill slots, e.g., Pizza_Size (filled with large) and Pizza_Toppings (filled with mushrooms and olives). The NLU subsystem may use machine learning based techniques, rules (which may be domain specific), or a combination of the two, to generate the logical forms. The logical forms generated by the NLU subsystem 110 are then fed to the DM subsystem 116 for further processing.

The DM subsystem 116 is configured to manage a dialog with the user based upon logical forms received from the NLU subsystem 110. As part of the dialog management, the DM subsystem 116 is configured to track dialog states, initiate the execution of or itself execute one of more actions or tasks, and determine how to interact with the user. These actions may include, for example, querying one or more databases, producing execution results, and other actions. For example, the DM subsystem 116 is configured to interpret the intents identified in the logical forms received from the NLU subsystem 110. Based upon the interpretations, the DM subsystem 116 may initiate one or more actions that it interprets as being requested by the voice inputs provided by the user. In certain embodiments, the DM subsystem 116 performs dialog states tracking based upon current and past voice inputs and based upon a set of rules (e.g., dialog policies) configured for the DM subsystem 116. These rules may specify the different dialog states, conditions for transitions between states, actions to be performed when in a particular state, and the like. These rules may be domain specific. The DM subsystem 116 also generates responses to be communicated back to the user involved in the dialog. These responses may be based upon actions initiated by the DM subsystem 116 and their results. The responses generated by the DM subsystem 116 are fed to the NLG subsystem 118 and/or the visual feedback generator subsystem 126 for further processing.

The NLG subsystem 118 is configured to generate natural language texts corresponding to the responses generated by the DM subsystem 116. The texts may be generated in a form that enables them to be converted to speech by the TTS subsystem 120. The TTS subsystem 120 receives the texts from the NLG subsystem 118 and converts each of them to speech or voice audio, which may then be output to the user via an audio or speech output component 124 of the dialog system (e.g., a speaker, or communication channel coupled to an external speaker). Alternatively, or additionally, the NLG subsystem 118 may transmit text output to the visual feedback generation subsystem 126 for further processing. In some instances, the speech output component 124 may be part of the dialog system 100. In some other instances, the speech output component 124 may be separate from and communicatively coupled to the dialog system 100.

The visual feedback generator subsystem 126 is configured to generate visual indications, which may indicate cognitive understanding of the dialog system at a given time. The visual indications may include icons, images, and/or text. The visual indications may indicate a discerned intent (e.g., an icon of a pizza when the discerned intent is order pizza). Alternatively, or additionally, the visual indications may indicate a discerned domain. A domain may represent a family or group of intents. Thus, a discerned domain may be linked to one or more intents. For example a visual indication may be an icon representing travel, which may correspond to multiple intents such as booking a flight, booking a hotel canceling a reservation, and modifying a reservation. The visual feedback generator subsystem transmits information characterizing the visual output to a display 130 for providing visual output 128 to the user 102. The display 130 may, for example, be a display screen on a mobile device, monitor, television, kiosk, or the like. The display presents the visual output to the user 102.

As described above, the various subsystems of the dialog system 100 working in cooperation provide the functionality that enables the dialog system 100 to receive speech inputs 104 and respond using speech outputs 122 and maintain a dialog with a user using natural language speech. The various subsystems described above may be implemented using a single computer system or using multiple computer systems working cooperatively. For example, for a device implementing the voice-enabled system, the subsystems of the dialog system 100 described above may be implemented entirely on the device with which the user interacts. In some other implementations, some components or subsystems of the dialog system 100 may be implemented on the device with which the user interacts, while other components may be implemented remotely from the device, possibly on some other computing devices, platforms, or servers.

As described above, in certain embodiments, a dialog system 100 may be implemented using a pipeline of subsystems. In some embodiments, one or more of the subsystems may be combined into a single subsystem. In certain embodiments, the functionality provided by a particular subsystem may be provided by multiple subsystems. A particular subsystem may also be implemented using multiple subsystems.

In certain embodiments, machine learning techniques may be used to implement one or more functions of the dialog system 100. For example, supervised machine learning techniques such as those implemented using a neural network (e.g., a deep neural network) may be used to implement one or more functions of the dialog system 100. As one example, a neural network may be provided that is trained to perform ASR functions performed and such a trained model may be used by the ASR subsystem 108 for its processing. Such a neural network implementation may take the speech input as input and output a text utterance to the NLU subsystem. Machine learning based models may also be used by other subsystems of the dialog system 100.

Figure 2:
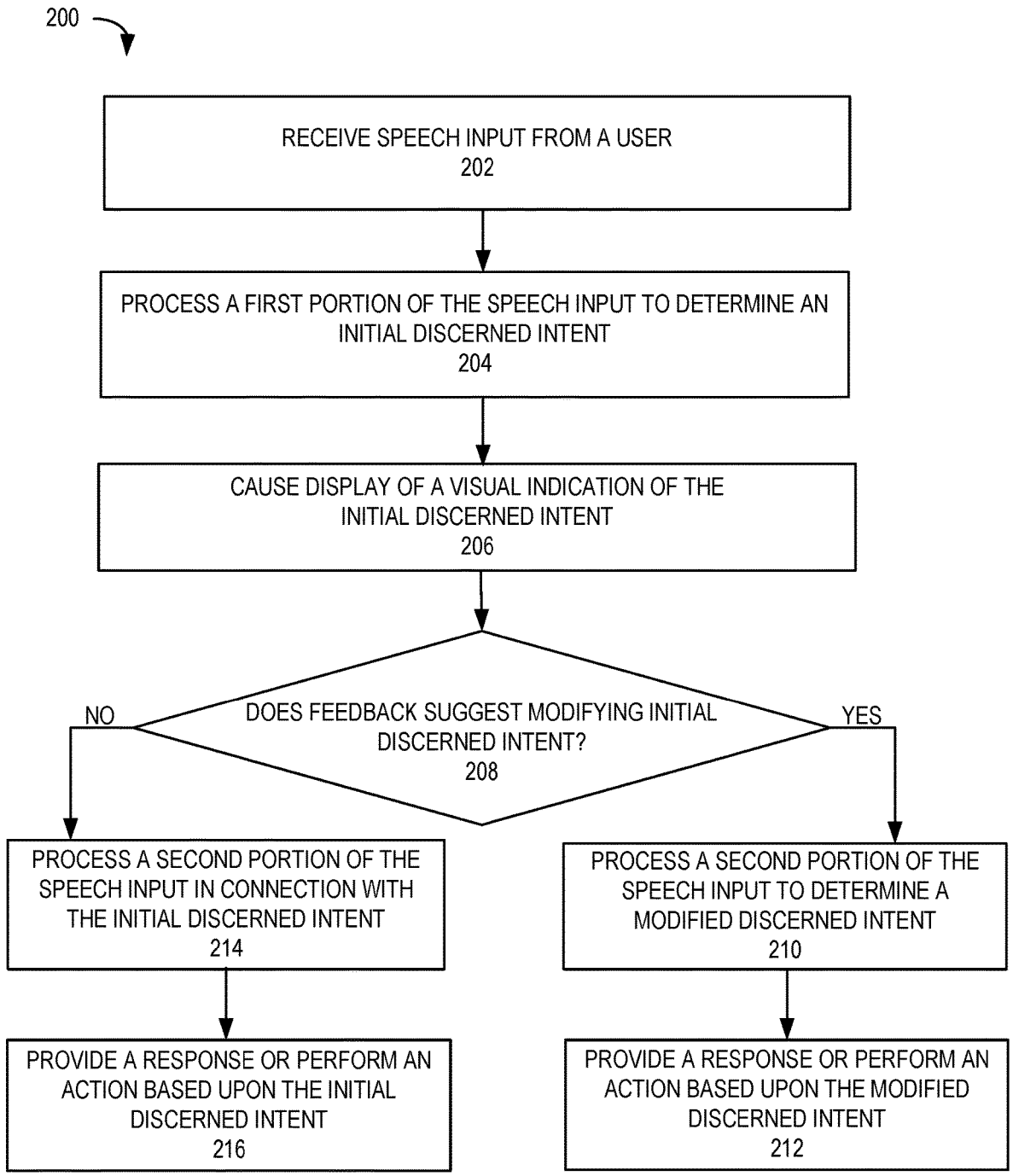
FIG. 2 is a simplified flowchart depicting a method for techniques for efficient dialog processing using feedback to certain embodiments.

FIG. 2 depicts a simplified flowchart illustrating a method 200 for efficient dialog processing using feedback, according to certain embodiments. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 2 and described below is intended to be illustrative and non-limiting. Although FIG. 2 depicts the various processing steps occurring in a particular sequence or order, this is not intended to be limiting. In certain alternative embodiments, the steps may be performed in some different order or some steps may also be performed in parallel. In certain embodiments, the processing depicted in FIG. 2 may be performed by the dialog system described above with respect to FIG. 1.

At 202, the dialog system receives speech input from a user. The speech input may include one or more sentences, and may include pauses (generally of a relatively short duration). The dialog system may receive the speech input, for example, via the speech input component 105 (e.g., a microphone of a user device or kiosk). The speech input may be received as a wave form. The speech input may be in a particular language and be in a natural language query form. The speech input may specify a question that the user wants the dialog system to answer, specify one or more actions that the user wants the dialog system to initiate (e.g., "I would like a medium pepperoni pizza."), and the like. The ASR subsystem 108 may process the speech input to generate a text utterance, which the ASR subsystem 108 passes to the NLU subsystem 110 for further processing.

In certain embodiments, instead of receiving spoken speech input (as in 202), input may be received in text form, for example, when a user types in text during a chat with a dialog system. The techniques described in this disclosure can be used with systems that receive input in the form of spoken speech, or text input, or combinations thereof.

At 204, the dialog system processes a first portion of the first speech input to determine an initial discerned intent. Processing speech input may include NLU processing, which may be executed by the natural language understanding subsystem 110. The dialog system may process the speech input using NLU operations such as semantic parsing, intent recognition, slot filling, and determining a domain. Processing speech input may further include ASR processing, which may be executed by the ASR subsystem 108. For example, the automated speech recognition subsystem 108 determines a first text utterance corresponding to the first portion of the speech input and provides the first text utterance to the natural language understanding subsystem 110. The natural language subsystem 110 then determines the initial discerned intent based upon the first text utterance. Alternatively, or additionally, text input received from a user may be processed directly by the NLU subsystem 110. The processing may further include determining a sentiment, identifying named entities, slot filling, and so forth.

As a result of the processing, the dialog system may determine an initial discerned intent. The initial discerned intent may correspond to a task that the dialog system has determined that the user is likely asking the dialog system to execute. For example, the initial discerned intent may be Find_Flight, Get_Weather, or Order_Delivery. In some cases, the initial discerned intent may correspond to an intent determined based upon partial input, e.g., based upon a partial spoken clause. Alternatively, or additionally, the dialog system may identify an initial discerned domain. For example, the initial discerned domain may be Travel or Weather.

In some embodiments, the dialog system determines the initial discerned intent using a machine learning model. The machine learning model may, for example, be a neural network trained to classify intents for utterances using sample intents and utterances. As a specific example, a classifier model may be applied to determine that the utterance "How do I get to Charleston?" is best classified with the intent "Directions_To," based on sample utterances for direction-related intents. Similarly, an initial discerned domain may be determined using a machine learning model such as a neural network trained to predict a likely domain based upon sample domain to utterance pairs. Examples of suitable model types include Hidden Markov Models (HMMs) and Gated recurrent units (GRUs).

In some embodiments, when each speech input is received (e.g., the first speech input, second speech input, etc.), the dialog system may classify and maintain a ranked set of intents or domains. For example, three domains may be discerned, with ratings from 10 (highest likelihood of matching the speech input) to 1 (lowest likelihood of matching the speech input). If a particular domain reaches an application-configurable threshold, then an event may be fired to display a visual indication at 206. Techniques for determining an initial discerned intent based on such a threshold are described further below with respect to FIG. 3.

The dialog system may process the first portion of speech input as additional portions of the speech input are received. The first portion of speech input, second portion of speech input, etc. may be immediately following one another substantially in real time as a continuous stream of spoken input form the user. Processing input substantially in real time may include processing a stream of input data as the input data is received, rather than waiting for an indication that the input has terminated. For example, the system may process a sentence or set of words while the user continues to provide speech input and the system continues to receive additional speech input. The dialog system may process the continuous stream of speech input in chunks or portions. For example, the NLU subsystem 110 processes a word or phrase at a time, rapidly moving to the next word or phrase in the stream. The chunks may correspond to a sentence or sets of words.

Alternatively, or additionally, the speech input may be processed using an integrated speech recognition and natural language understanding pipeline. For example, a single neural network may be used to generate a logical form from speech input (e.g., without an intermediate step of outputting a text utterance). Techniques for integrated speech recognition and natural language understanding are described in, e.g., Lugosh et al., *Speech Model Pre-training for End-to-End Spoken Language Understanding* (https://arxiv.org/pdf/1904.03670.pdf) and Haghani et al., *From Audio to Semantics: Approaches to end-to-end spoken language understanding* (https://arxiv.org/abs/1809.09190).

At 206, the dialog system causes display of a visual indication of the initial discerned intent. Causing display may include rendering the visual indication on a display element of the dialog system. Alternatively, or additionally, causing display may include transmitting instructions to a remote display device, thereby causing the remote display device to display the visual indication. The visual indication may include one or more of: text specifying a domain associated with the discerned intent, text specifying the discerned intent, an image indicating a domain associated with the discerned intent, or an image indicating the discerned intent. A domain or intent may be specified in text form (e.g., Travel or Book_Flight). Alternatively, or additionally, a domain or intent may be specified by an image such as an application or skill icon, an emoji, and so forth. For example, the dialog system discerns that the user request relates to expenses, and displays an expenses app icon. Such a visual cue can be very helpful to give users confidence they are interacting with supported functionality but also allow them to change course mid-stream if things get off track.

The dialog system may process the user input substantially in real-time, and as soon as the dialog system determines a discerned intent, the dialog system may present the user with the visual indication. The dialog system may continuously present an understanding of context as the user speaks one or more sentences. The user feedback can be through words, pictures or through natural language generation. For example, the dialog system predicts that the speech input corresponds to the Travel domain. The dialog system displays the text "TRAVEL." As another example, the dialog system predicts an initial discerned intent, Find_Contact, along with identifying the named entity John. The dialog system displays a list of all of the user's contacts named John on a screen. In some cases, the dialog system may display the visual indications as a complete question or sentence, e.g., "Do you want to change your flight?". Alternatively, or additionally, the dialog system may display an image such as a picture of an airplane, an emoji related to travel, and/or the like, to indicate an initial discerned intent and/or domain.

In some embodiments, the dialog system displays a visual indication of a confidence level in the initial discerned intent. For example, the dialog system has low confidence in the initial discerned intent, and displays an indication of the low confidence level. As a specific example, the dialog system may display an emoji with a confused expression or a question mark to indicate that clarification is required. As another example, the dialog system may include or be communicatively coupled to a robot, and the indication may be a head nod from the robot as an indication that it is understanding the received speech input. In some embodiments, the dialog system may display an emoji to indicate a current sentiment determined at 204.

In some embodiments, the dialog system displays the visual indication substantially simultaneously to receiving the continuous stream second speech input from the user. "Substantially simultaneously," as used herein, refers to displaying the indication in the course of a dialog, e.g., speech input may be received within about 1 second before and/or after the discerned intent is displayed, and/or without the dialog system determining that the user is done speaking.

At 208, the dialog system determines whether feedback suggests modifying the initial discerned intent. If the initial discerned intent or domain was inaccurate, then the user may provide feedback to guide the dialog system towards the correct intent or domain. The feedback may be part of the continuous stream of speech input received (e.g., a second portion of the speech input, a third portion of the speech input, etc.).

Based upon the visual indication displayed at 206, the user may determine whether the initial discerned intent is accurate. The user may determine that the discerned intent indicated by the visual indication does, or does not, actually correspond to the intent that the user is trying to convey or the action that the user seeks to initiate. The user may determine on the fly whether the initial discerned intent is accurate. By using the visual cue provided at 206, the user can continue to provide speech input while evaluating the visual indication. The visual indication can allow the user to see that the system might misunderstand the input provided. Thus, the user is able to provide further information seamlessly. Or, if the intent is correct, the visual cue can also be very helpful to give the user confidence that she is interacting with a system-supported functionality.

Feedback may suggest modifying the initial discerned intent (e.g., "yes" at 208) if the a second portion of the speech input explicitly states, or hints that, the initial discerned intent is incorrect. For example, in a first portion of a stream of speech input, the user was referring to a steakhouse called John Howie, and the displayed indication of the initial discerned intent was an icon denoting contacts (e.g., the initial discerned intent was to identify a contact called John Howie). Responsive to viewing the icon, the user corrects the system by continuing to speak and say, "No, I am talking about the steak house."

Feedback may not suggest modifying the initial discerned intent (e.g., "no" at 208) if the feedback confirms or disregards the initial discerned intent. For example, the user may confirm that a displayed discerned intent is correct (e.g., by saying, "Yes, I want to buy a ticket to New York."). As another example, the user may continue speaking without regard for the displayed indication, and the dialog system may continue to process the received input based on the initial discerned intent.

At 210, if feedback suggests modifying the initial discerned intent at 208, then the dialog system processes a second portion of the speech input to determine a modified discerned intent. The second portion of the speech input corrects the initial discerned intent. For example, the user notices that the wrong domain icon is displayed at 206, and the user thereby provides adjusted input mid-stream. As a specific example, the continuous stream of speech input is: "Add my dinner expense for $100 [first speech input] using the expenses skill [second speech input, adjusted to specify the intended intent]."

The dialog system modifies the discerned intent, responsive to the second portion of the speech input. The dialog system may utilize the second portion of the speech input (e.g., real-time feedback) to improve the system's cognitive understanding of user inputs and context. For example, based upon the second portion of the speech input specifying that the user wants to make a reservation at a steakhouse, rather than call a contact named John Howie, the dialog system selects the Make_Reservation intent rather than the Find_Contact intent.

At 212, the dialog system provides a response or performs an action based upon the modified discerned intent. In some embodiments, the dialog system determines a response based upon the modified discerned intent. The response may further be based upon other aspects of the speech input, such as identified named entities and sentiments. The dialog system may provide, to the user, the response. Providing the response may be executed by preparing and outputting speech output. The dialog system may prepare a text response via the dialog manager subsystem 116 and NLG subsystem 118. Such a text response may be passed to the text-to speech subsystem 120, which converts the text response to a spoken response. The spoken response is then outputted as speech output 122 via speech output component 124. Alternatively, or additionally, a text response may be displayed to the user via display 130.

Alternatively, or additionally, based upon the modified discerned intent determined at 210, the dialog system may execute a task corresponding to the modified discerned intent. For example, the system may place a food order, book a flight, retrieve information from a database, or the like, based upon the intent that has been adjusted responsive to the user feedback.

At 214, if feedback does not suggest modifying the initial discerned intent at 208, then the dialog system processes a second portion of the speech input in connection with the initial discerned intent. If the initial discerned intent determined at 204 and displayed at 206 was accurate, then the dialog system may process supplementary information received in the second portion of the stream of speech input. For example, the dialog system may fill slots, using the second portion of the speech input, in connection with the initial discerned intent, which was determined based upon the first portion of the speech input. Alternatively, or additionally, the dialog system may perform sentiment analysis in connection with the initial discerned intent using the second portion of the speech input.

At 216, the dialog system provides a response or performs an action based upon the initial discerned intent. In a similar fashion as described above with respect to 212, the dialog system may determine and provide a response and/or perform one or more actions based upon the initial discerned intent.

Alternatively, or additionally, the processing depicted in FIG. 2 may be applied for a set of domains. The dialog system may determine an initial discerned domain, display an indication of the initial discerned domain, and adjust the initial discerned domain as needed, in a similar fashion as described above with respect to intents.

Figure 3:
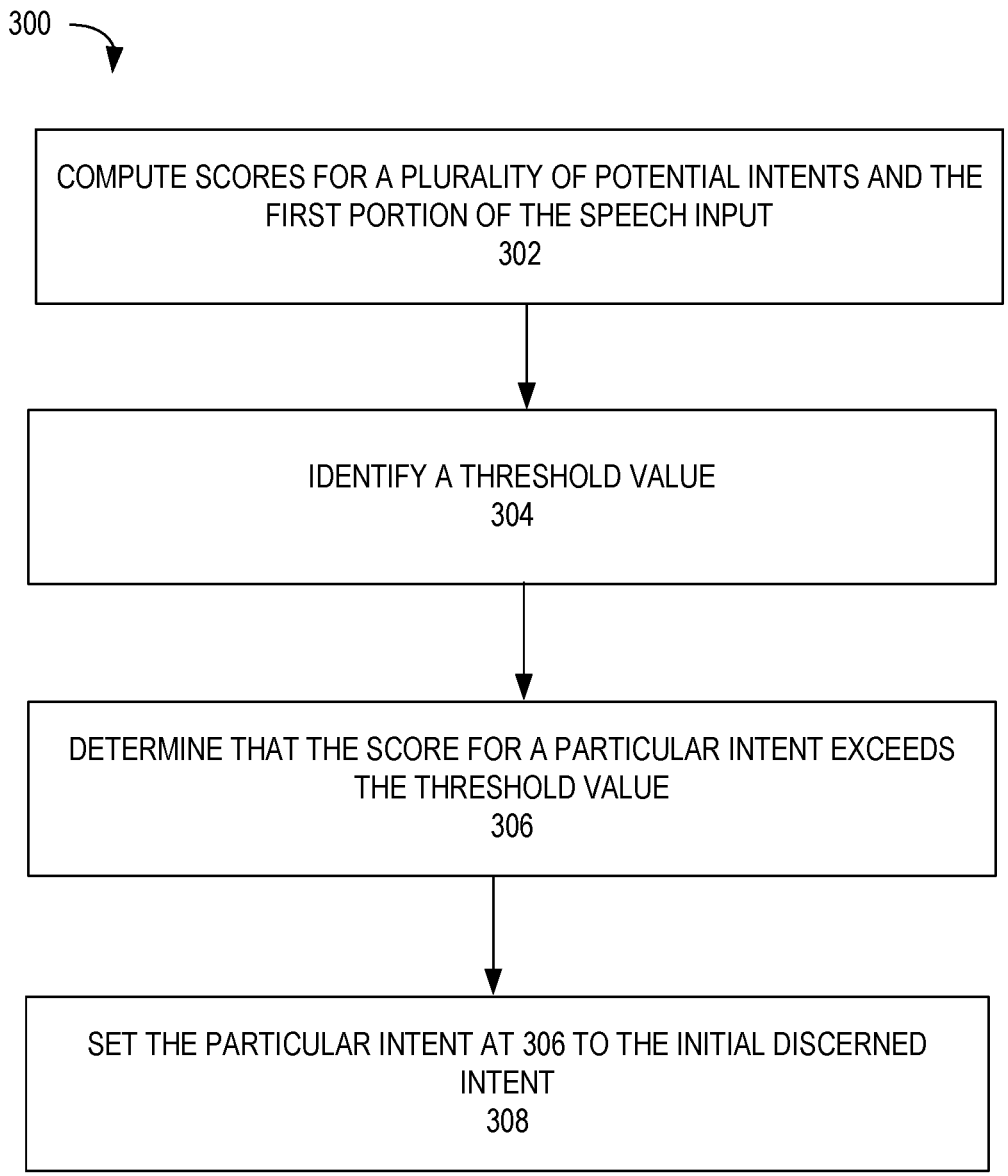
FIG. 3 is a simplified flowchart depicting techniques for determining and displaying an initial discerned intent according to certain embodiments.

FIG. 3 depicts a simplified flowchart illustrating a method 300 for determining the initial discerned intent at block 204 of FIG. 2, according to some embodiments. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel. In certain embodiments, the processing depicted in FIG. 3 may be performed by the dialog system described above with respect to FIG. 1.

At 302, the dialog system computes a plurality of scores for a respective plurality of potential intents and the first portion of the speech input. The dialog system may compute the scores using a machine learning model such as a logistic regression model or a neural network. Specific examples of suitable models include a Long Short Term Memory (LSTM) recurrent neural network, (see, e.g., K Sreelakshmi et al., *Deep Bi-Directional LSTM Network for Query Intent Detection,* 8th International Conference on Advances in Computing & Communications (ICACC-2018), Rajkumar Buyy and, Sherly K. K, eds. (2018)), and Bidirectional Encoder Representations from Transformers (BERT) (see, e.g., Devlin, Jacob; Chang, Ming-Wei; Lee, Kenton; Toutanova, Kristina, "BERT: Pre-training of Deep Bidirectional Transformers for Language Understanding". arXiv: 1810.04805v2 (2018)). Such a model may have previously been trained on datasets pairing sample text inputs to corresponding intents. In some embodiments, the output of the model is a score indicating a probability that a system-supported intent corresponds to the intent of the speech input received at 202.

At 304, the dialog system identifies a threshold value. The dialog system may store one or more threshold values for use in determining whether a particular intent is deemed likely enough to correspond to the user's actual intent. The dialog system may retrieve the stored threshold value. In some embodiments, the threshold value may be an application-configurable threshold—the dialog system may accept and apply input (e.g., from an administrator) to configure one or more threshold values. For example, functionalities of the dialog system may be provided as cloud services to different companies, and different companies may configure different thresholds appropriate for their uses.

At 306, the dialog system determines that the score for a particular intent exceeds the threshold value. The dialog system may compare the score for each intent, as computed at 302, to the threshold value identified at 304, until finding that the score for a particular intent, of the plurality of potential intents, exceeds the threshold value.

At 306, the dialog system sets the particular intent at 306 to the initial discerned intent. Based on the score exceeding the threshold value, the dialog system may determine that the corresponding particular intent is sufficiently likely to be the user's actual intent. Accordingly, the dialog system thereby sets the particular intent to initial discerned intent.

After 308, the dialog system may cause display of the visual indication as described above at 206. Causing display of the visual indication of the initial discerned intent is triggered by the determination that the score for a particular intent exceeds the threshold value at 306. If a particular intent reaches the threshold, then an event is fired that can update the graphical interface or be intercepted by the dialog system.

Alternatively, or additionally, the processing depicted in FIG. 3 may be applied for a set of domains. The dialog system may assign scores to a plurality of domains. For example, a neural network may be trained to classify a domain for a speech input. This may include computing scores which indicate how well each of a set of domains matches up to the speech input. Alternatively, or additionally, the model may compute scores for intents, each of which maps to a corresponding domain. The dialog system may compare each score to a predetermined threshold value. As a result, the dialog system identifies a domain, which is likely enough to trigger displaying the visual indication at 306. The dialog system may then display a visual indication of the domain (e.g., a weather icon, which may indicate that the initial discerned intent is weather-related).

FIGS. 4A-4D depict examples of interface views 400A-400D according to some embodiments. The display 130 of the dialog system 100 of FIG. 1 may display an interface as illustrated in FIGS. 4A-4D to provide visual cues of a discerned intent to a user.

Figure 4A:
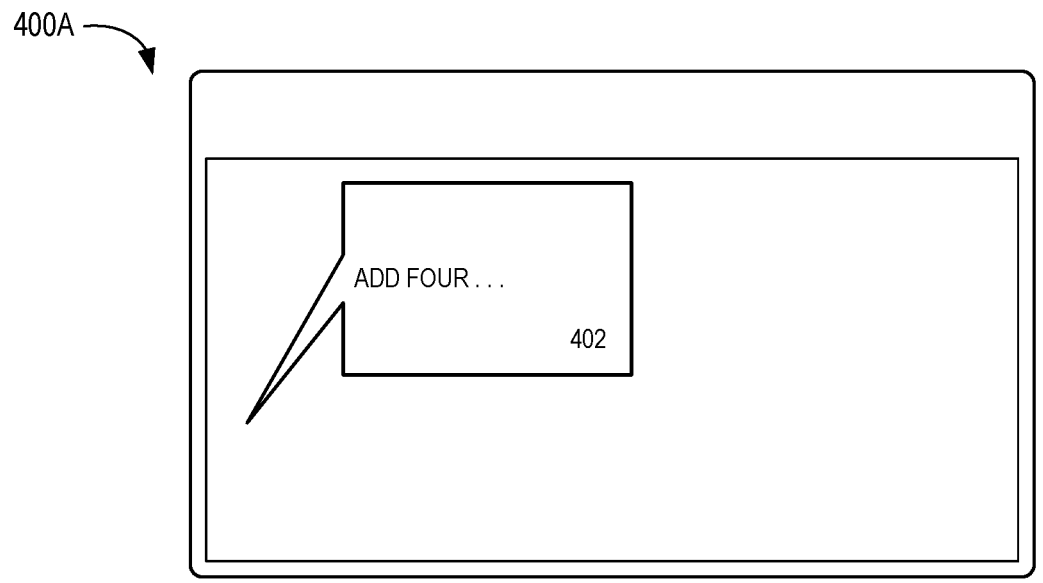
FIGS. 4A-4D depict interface views according to certain embodiments.

FIG. 4A shows a first interface view 400A. The first interface view may be displayed to a user to illustrate input provided by the user to the dialog system. The input may be received as text input, or received as voice input, which is processed by the dialog system to determine the displayed text. In the example illustrated in FIG. 4A, the user has provided the input "Add four . . ." The dialog system displays the input "Add four" in a text bubble 402. This may correspond to a first portion of a continuous stream of voice input. In some embodiments, the dialog system may produce the text based on voice input, and display the determined text utterance. In the event the text output does not correctly match the voice input, the user can correct or adjust midstream.

Figure 4B:
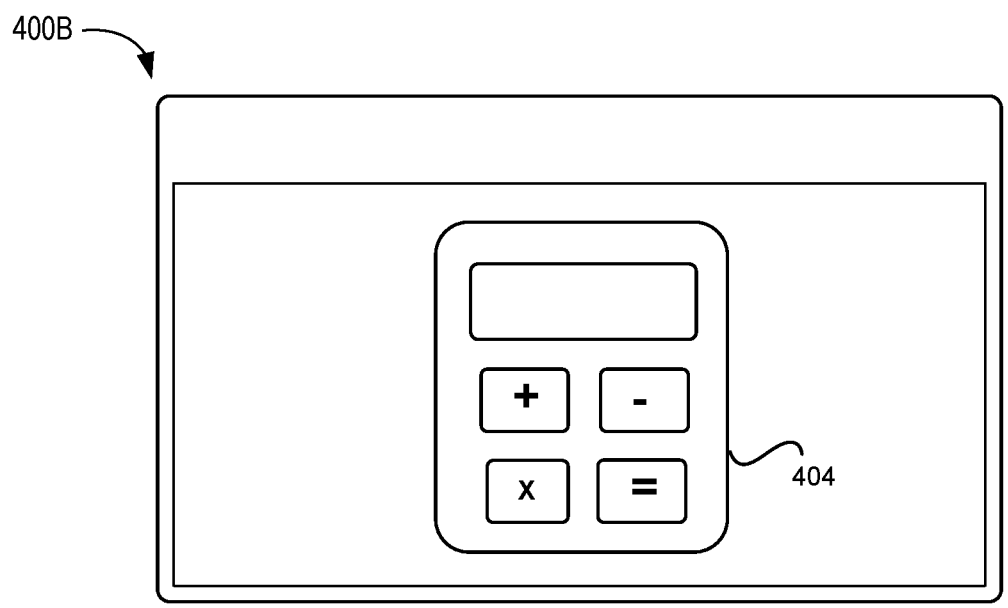

FIG. 4B shows a second interface view 400B. The second interface view displays a visual indication of an initial discerned intent 404. In the example shown in FIG. 4B, the visual indication of the initial discerned is a calculator icon. The visual indication of the initial discerned intent 404 represents an initial discerned intent determined by the dialog system. In this case, based upon the speech input shown in FIG. 4A, the dialog system determines that there is a sufficient likelihood that the intent is to add numbers in order to trigger displaying a visual indication of the discerned intent. Adding numbers corresponds to a calculator skill. Accordingly, the dialog system displays a calculator icon.

Figure 4C:
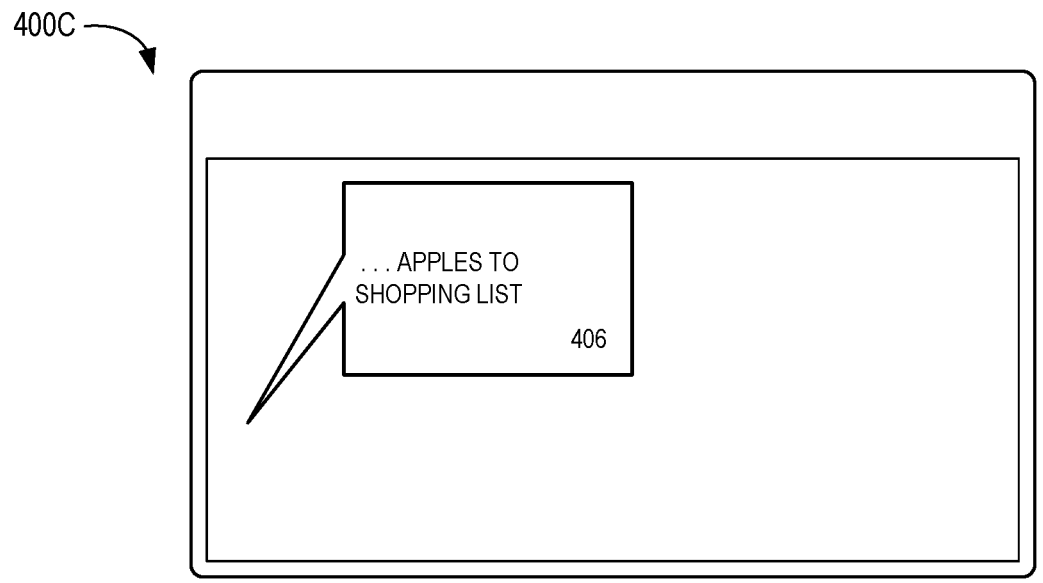

FIG. 4C shows a third interface view 400C. The third interface view 400C may be shown to a user to illustrate voice or text input provided by the user to the dialog system. In the example illustrated in FIG. 4C, the user has provided the input ". . . apples to shopping list." The dialog system displays the partial input "apples to shopping list" in a text bubble 406. This may correspond to a second portion of a continuous stream of speech input. The speech input shown in FIG. 4C is responsive to the icon displayed at FIG. 4B—the calculator icon indicates that the dialog system is not following that the user is referring to a shopping list, so the user makes sure to indicate specifically that this refers to a shopping list in the second portion of the continuous stream of speech input shown in FIG. 4C.

Figure 4D:
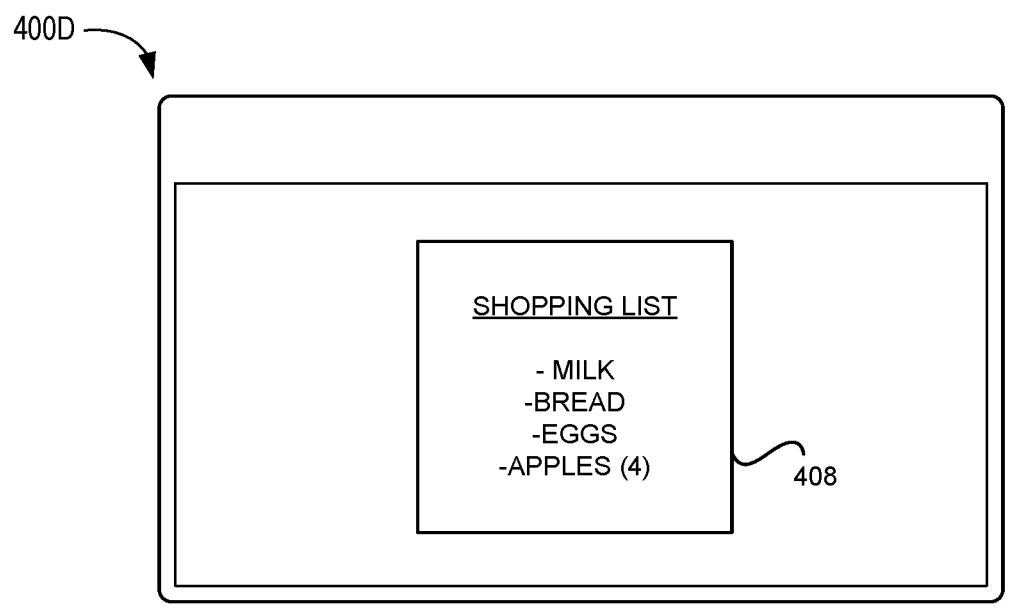

FIG. 4D shows a fourth interface view 400D. The fourth interface view 400D displays a result 408. The result 408 is a shopping list with four apples added, responsive to the speech input indicated in FIGS. 4A and 4C. By displaying the initial discerned intent indication as shown in FIG. 4B, the dialog system is able to steer the dialog so as to quickly determine the correct intent and determine and provide the results shown in FIG. 4D.

The techniques described herein provide multiple advantages. By processing user input and providing preliminary understandings thereof in real time, the system can more accurately replicate a natural speech interaction. For example, when two people are speaking, visual cues can be very useful in letting one person know if the other person is following what they are saying. Similarly, by leveraging real-time natural language processing, the dialog system can present a visual indication to a user to let the user know whether the dialog system is interpreting the user's speech as intended.

In contrast, in a typical system processing speech or typed user input, the system will wait until a spoken clause is complete before taking some time to process the spoken clause and returning a result. If the result is wrong, or additional information is required, this can result in an undesirable start-and-stop pattern to the interaction and/or an extended series of inputs and outputs to get the dialog on track. This results in more time, more processing, and more computing resources being expended, in contrast with the techniques described herein. The techniques described herein prevent these issues and save time and computing resources. Accordingly, the techniques described herein can reduce the overall time and processing required to perform a user-requested function, as the system can give and receive feedback in real time to improve the system's cognitive understanding of the received speech input, rather than stop and restart the conversation when the user is misunderstood.

The infrastructure described above can be implemented in various different environments including a cloud environment (could be various types of clouds including private, public, and hybrid cloud environments), on-premises environment, a hybrid environment, and the like.

Figure 5:
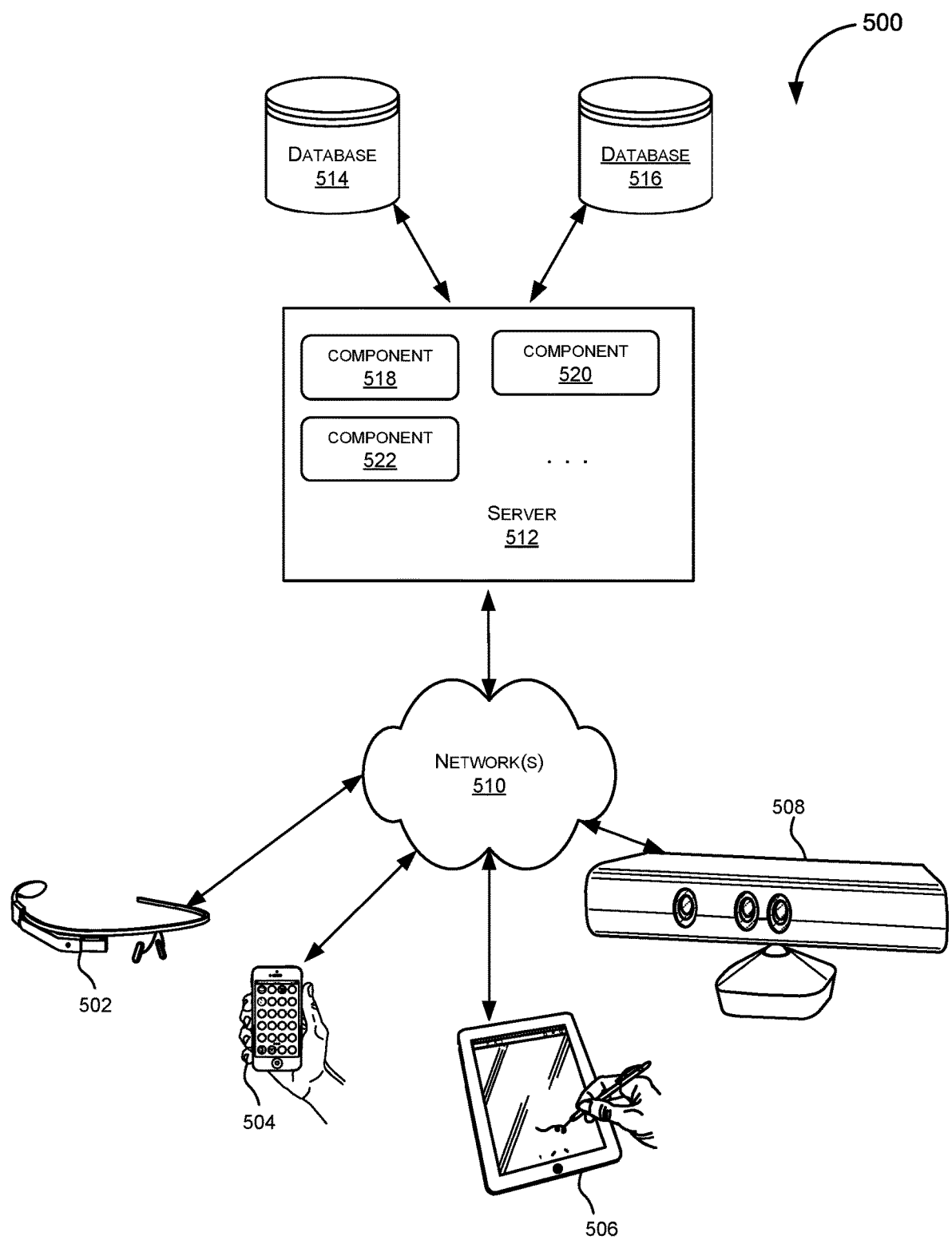
FIG. 5 depicts a simplified diagram of a distributed system for implementing an embodiment.

FIG. 5 depicts a simplified diagram of a distributed system 500 for implementing an embodiment. In the illustrated embodiment, distributed system 500 includes one or more client computing devices 502, 504, 506, and 508, coupled to a server 512 via one or more communication networks 510. Clients computing devices 502, 504, 506, and 508 may be configured to execute one or more applications.

In various embodiments, server 512 may be adapted to run one or more services or software applications that enable using user feedback to improve cognitive understanding in a dialog system.

In certain embodiments, server 512 may also provide other services or software applications that can include non-virtual and virtual environments. In some embodiments, these services may be offered as web-based or cloud services, such as under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in FIG. 5, server 512 may include one or more components 518, 520 and 522 that implement the functions performed by server 512. These components may include software components that may be executed by one or more processors, hardware components, or combinations thereof. It should be appreciated that various different system configurations are possible, which may be different from distributed system 500. The embodiment shown in FIG. 5 is thus one example of a distributed system for implementing an embodiment system and is not intended to be limiting.

Users may use client computing devices 502, 504, 506, and/or 508 to use user feedback to improve cognitive understanding in a dialog system in accordance with the teachings of this disclosure. A client device may provide an interface that enables a user of the client device to interact with the client device. The client device may also output information to the user via this interface. Although FIG. 5 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 510 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 510 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 512 can include one or more virtual machines running virtual operating systems, or other computing architectures involving virtualization such as one or more flexible pools of logical storage devices that can be virtualized to maintain virtual storage devices for the server. In various embodiments, server 512 may be adapted to run one or more services or software applications that provide the functionality described in the foregoing disclosure.

The computing systems in server 512 may run one or more operating systems including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more data repositories 514, 516. These data repositories may be used to store data and other information in certain embodiments. For example, one or more of the data repositories 514, 516 may be used to store information such as dialog history. Data repositories 514, 516 may reside in a variety of locations. For example, a data repository used by server 512 may be local to server 512 or may be remote from server 512 and in communication with server 512 via a network-based or dedicated connection. Data repositories 514, 516 may be of different types. In certain embodiments, a data repository used by server 512 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 514, 516 may also be used by applications to store application data. The data repositories used by applications may be of different types such as, for example, a key-value store repository, an object store repository, or a general storage repository supported by a file system.

Figure 6:
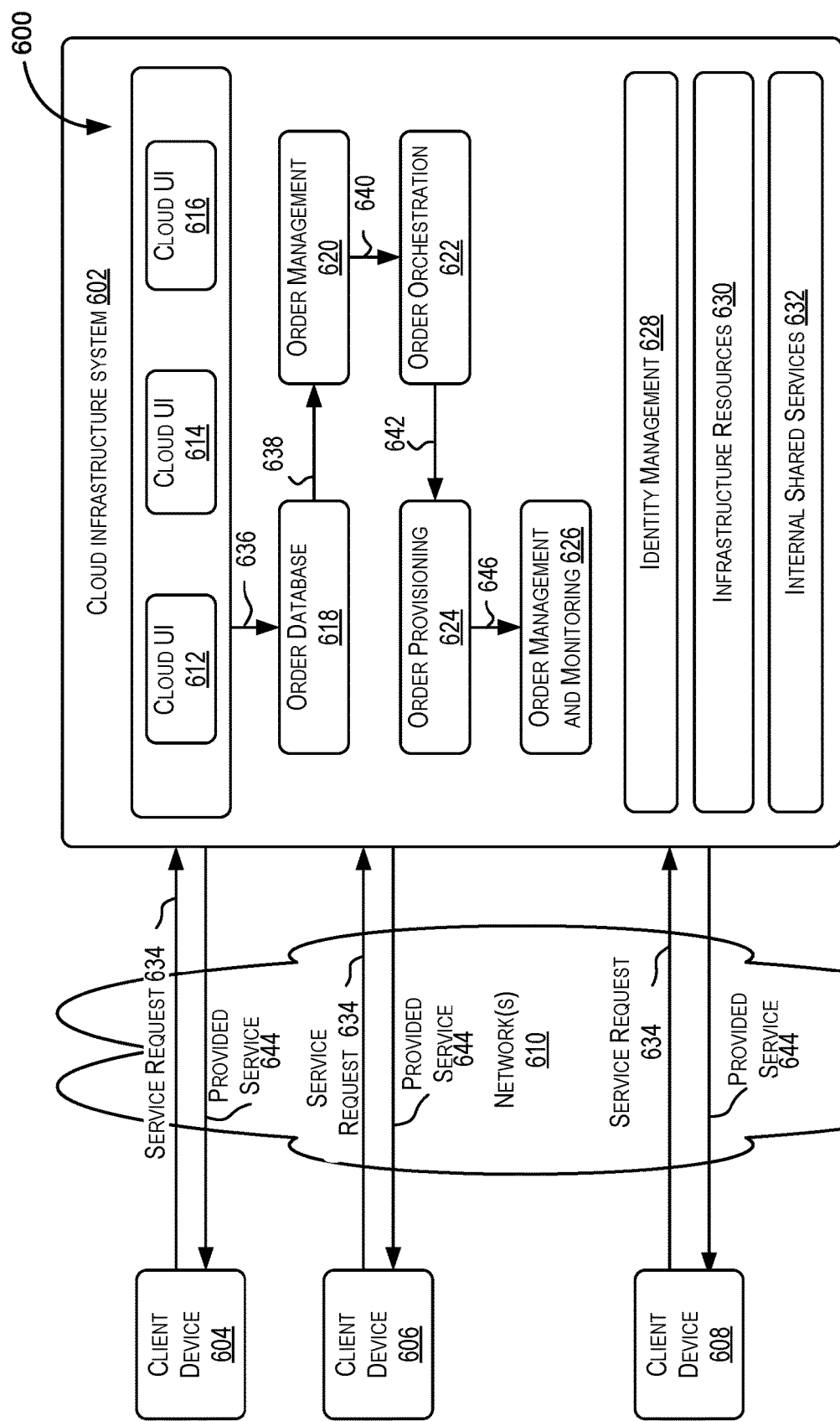
FIG. 6 is a simplified block diagram of a cloud-based system environment in which various storage-related services may be offered as cloud services, in accordance with certain embodiments.

In certain embodiments, the NLU-related functionalities described in this disclosure may be offered as services via a cloud environment. FIG. 6 is a simplified block diagram of a cloud-based system environment in which various NLU-related services may be offered as cloud services, in accordance with certain embodiments. In the embodiment depicted in FIG. 6, cloud infrastructure system 602 may provide one or more cloud services that may be requested by users using one or more client computing devices 604, 606, and 608. Cloud infrastructure system 602 may comprise one or more computers and/or servers. The computers in cloud infrastructure system 602 may be organized as general purpose computers, specialized server computers, server farms, server clusters, or any other appropriate arrangement and/or combination.

Network(s) 610 may facilitate communication and exchange of data between clients 604, 606, and 608 and cloud infrastructure system 602. Network(s) 610 may include one or more networks. The networks may be of the same or different types. Network(s) 610 may support one or more communication protocols, including wired and/or wireless protocols, for facilitating the communications.

The embodiment depicted in FIG. 6 is only one example of a cloud infrastructure system and is not intended to be limiting. It should be appreciated that, in some other embodiments, cloud infrastructure system 602 may have more or fewer components than those depicted in FIG. 6, may combine two or more components, or may have a different configuration or arrangement of components. For example, although FIG. 6 depicts three client computing devices, any number of client computing devices may be supported in alternative embodiments.

The term cloud service is generally used to refer to a service that is made available to users on demand and via a communication network such as the Internet by systems (e.g., cloud infrastructure system 602) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 602 may provide one or more cloud services using different models such as under a Software as a Service (SaaS) model, a Platform as a Service (PaaS) model, an Infrastructure as a Service (IaaS) model, and others, including hybrid service models. Cloud infrastructure system 602 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 602. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 602. Cloud infrastructure system 602 then performs processing to provide the services requested in the customer's subscription order. For example, cloud infrastructure system 602 uses historical context to influence dialog tasks. Cloud infrastructure system 602 may be configured to provide one or even multiple cloud services.

Cloud infrastructure system 602 may provide the cloud services via different deployment models. In a public cloud model, cloud infrastructure system 602 may be owned by a third party cloud services provider and the cloud services are offered to any general public customer, where the customer can be an individual or an enterprise. In certain other embodiments, under a private cloud model, cloud infrastructure system 602 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 602 and the services provided may be shared by several organizations in a related community. Various other models such as hybrids of the above mentioned models may also be used.

Client computing devices 604, 606, and 608 may be of different types (such as devices 502, 504, 506, and 508 depicted in FIG. 5) and may be capable of operating one or more client applications. A user may use a client device to interact with cloud infrastructure system 602, such as to request a service provided by cloud infrastructure system 602. For example, a user may use a client device to request a NLU-related service described in this disclosure.

In some embodiments, the processing performed by cloud infrastructure system 602 for providing NLU-related services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 602 for identifying an intent based upon received speech input. The data used for this analysis may include structured data (e.g., data stored in a database or structured according to a structured model) and/or unstructured data (e.g., data blobs (binary large objects)).

As depicted in the embodiment in FIG. 6, cloud infrastructure system 602 may include infrastructure resources 630 that are utilized for facilitating the provision of various cloud services offered by cloud infrastructure system 602. Infrastructure resources 630 may include, for example, processing resources, storage or memory resources, networking resources, and the like.

In certain embodiments, to facilitate efficient provisioning of these resources for supporting the various cloud services provided by cloud infrastructure system 602 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services that may include those described above for server 512. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 602 may itself internally use services 632 that are shared by different components of cloud infrastructure system 602 and which facilitate the provisioning of services by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 602 may comprise multiple subsystems. These subsystems may be implemented in software, or hardware, or combinations thereof. As depicted in FIG. 6, the subsystems may include a user interface subsystem 612 that enables users or customers of cloud infrastructure system 602 to interact with cloud infrastructure system 602. User interface subsystem 612 may include various different interfaces such as a web interface 614, an online store interface 616 where cloud services provided by cloud infrastructure system 602 are advertised and are purchasable by a consumer, and other interfaces 618. For example, a customer may, using a client device, request (service request 634) one or more services provided by cloud infrastructure system 602 using one or more of interfaces 614, 616, and 618. For example, a customer may access the online store, browse cloud services offered by cloud infrastructure system 602, and place a subscription order for one or more services offered by cloud infrastructure system 602 that the customer wishes to subscribe to. The service request may include information identifying the customer and one or more services that the customer desires to subscribe to. For example, a customer may place a subscription order for a NLU-related service offered by cloud infrastructure system 602. As part of the order, the customer may provide speech input identifying a request.

In certain embodiments, such as the embodiment depicted in FIG. 6, cloud infrastructure system 602 may comprise an order management subsystem (OMS) 620 that is configured to process the new order. As part of this processing, OMS 620 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 620 may then invoke the order provisioning subsystem (OPS) 624 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 624 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 602 may send a response or notification 644 to the requesting customer to indicate when the requested service is now ready for use. In some instances, information (e.g., a link) may be sent to the customer that enables the customer to start using and availing the benefits of the requested services. In certain embodiments, for a customer requesting the NLU-related service, the response may include a response generated based upon an identified intent.

Cloud infrastructure system 602 may provide services to multiple customers. For each customer, cloud infrastructure system 602 is responsible for managing information related to one or more subscription orders received from the customer, maintaining customer data related to the orders, and providing the requested services to the customer. Cloud infrastructure system 602 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 602 may provide services to multiple customers in parallel. Cloud infrastructure system 602 may store information for these customers, including possibly proprietary information. In certain embodiments, cloud infrastructure system 602 comprises an identity management subsystem (IMS) 628 that is configured to manage customers information and provide the separation of the managed information such that information related to one customer is not accessible by another customer. IMS 628 may be configured to provide various security-related services such as identity services, such as information access management, authentication and authorization services, services for managing customer identities and roles and related capabilities, and the like.

Figure 7:
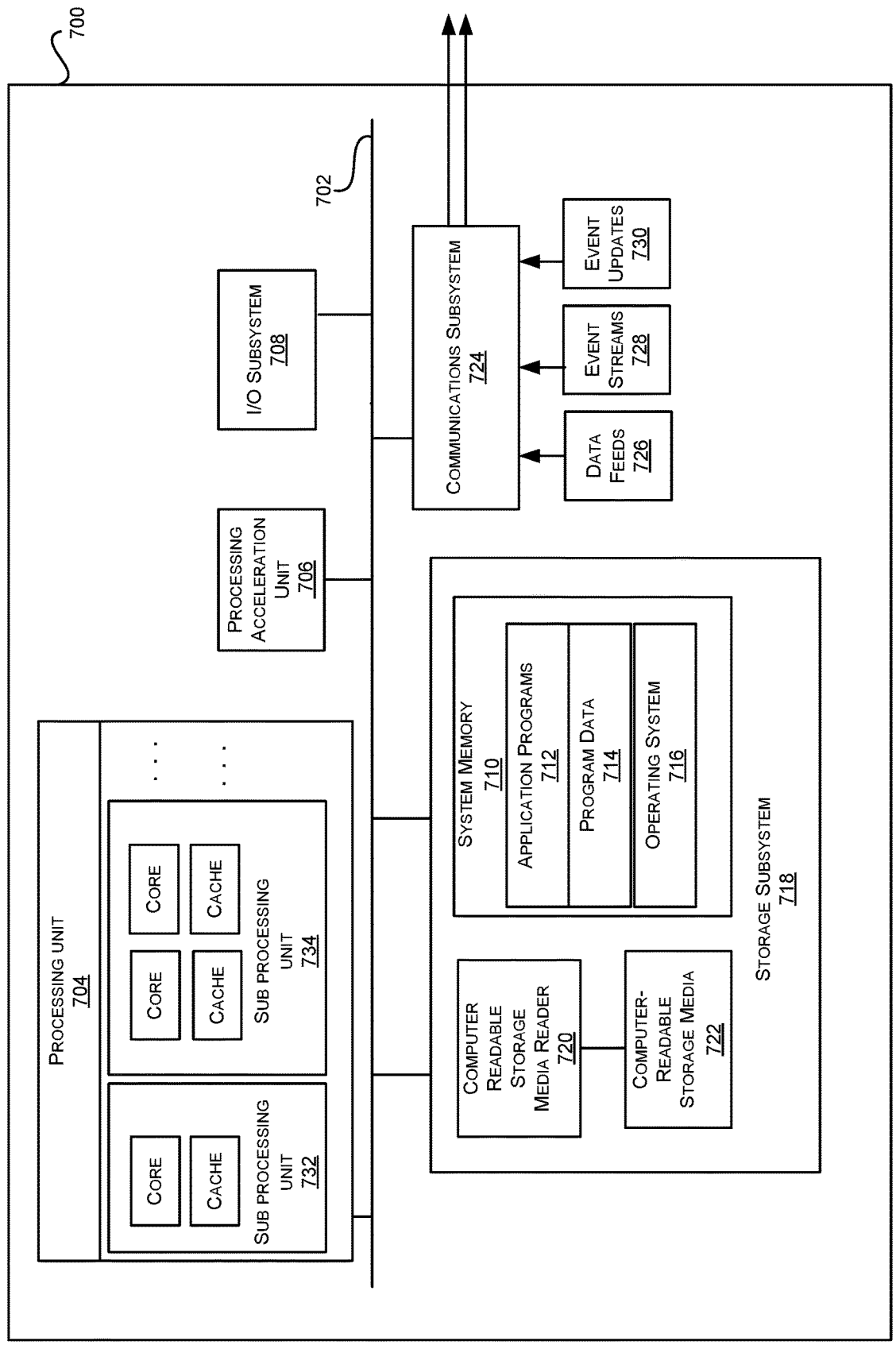
FIG. 7 illustrates an exemplary computer system that may be used to implement certain embodiments.

FIG. 7 illustrates an exemplary computer system 700 that may be used to implement certain embodiments. For example, in some embodiments, computer system 700 may be used to implement any of the ASR subsystem, NLU subsystem, and various servers and computer systems described above. As shown in FIG. 7, computer system 700 includes various subsystems including a processing subsystem 704 that communicates with a number of other subsystems via a bus subsystem 702. These other subsystems may include a processing acceleration unit 706, an I/O subsystem 708, a storage subsystem 718, and a communications subsystem 724. Storage subsystem 718 may include non-transitory computer-readable storage media including storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 704 controls the operation of computer system 700 and may comprise one or more processors, application specific integrated circuits (ASICs), or field programmable gate arrays (FPGAs). The processors may include be single core or multicore processors. The processing resources of computer system 700 can be organized into one or more processing units 732, 734, etc. A processing unit may include one or more processors, one or more cores from the same or different processors, a combination of cores and processors, or other combinations of cores and processors. In some embodiments, processing subsystem 704 can include one or more special purpose co-processors such as graphics processors, digital signal processors (DSPs), or the like. In some embodiments, some or all of the processing units of processing subsystem 704 can be implemented using customized circuits, such as application specific integrated circuits (ASICs), or field programmable gate arrays (FPGAs).

In some embodiments, the processing units in processing subsystem 704 can execute instructions stored in system memory 710 or on computer readable storage media 722. In various embodiments, the processing units can execute a variety of programs or code instructions and can maintain multiple concurrently executing programs or processes. At any given time, some or all of the program code to be executed can be resident in system memory 710 and/or on computer-readable storage media 722 including potentially on one or more storage devices. Through suitable programming, processing subsystem 704 can provide various functionalities described above. In instances where computer system 700 is executing one or more virtual machines, one or more processing units may be allocated to each virtual machine.

In certain embodiments, a processing acceleration unit 706 may optionally be provided for performing customized processing or for off-loading some of the processing performed by processing subsystem 704 so as to accelerate the overall processing performed by computer system 700.

I/O subsystem 708 may include devices and mechanisms for inputting information to computer system 700 and/or for outputting information from or via computer system 700. In general, use of the term input device is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 700 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 718 provides a repository or data store for storing information and data that is used by computer system 700. Storage subsystem 718 provides a tangible non-transitory computer-readable storage medium for storing the basic programming and data constructs that provide the functionality of some embodiments. Storage subsystem 718 may store software (e.g., programs, code modules, instructions) that when executed by processing subsystem 704 provides the functionality described above. The software may be executed by one or more processing units of processing subsystem 704. Storage subsystem 718 may also provide a repository for storing data used in accordance with the teachings of this disclosure.

Storage subsystem 718 may include one or more non-transitory memory devices, including volatile and non-volatile memory devices. As shown in FIG. 7, storage subsystem 718 includes a system memory 710 and a computer-readable storage media 722. System memory 710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random access memory (SRAM), dynamic random access memory (DRAM), and the like.

By way of example, and not limitation, as depicted in FIG. 7, system memory 710 may load application programs 712 that are being executed, which may include various applications such as Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 722 may store programming and data constructs that provide the functionality of some embodiments. Computer-readable media 722 may provide storage of computer-readable instructions, data structures, program modules, and other data for computer system 700. Software (programs, code modules, instructions) that, when executed by processing subsystem 704 provides the functionality described above, may be stored in storage subsystem 718. By way of example, computer-readable storage media 722 may include non-volatile memory such as a hard disk drive, a magnetic disk drive, an optical disk drive such as a CD ROM, DVD, a Blu-RayR® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 718 may also include a computer-readable storage media reader 720 that can further be connected to computer-readable storage media 722. Reader 720 may receive and be configured to read data from a memory device such as a disk, a flash drive, etc.

In certain embodiments, computer system 700 may support virtualization technologies, including but not limited to virtualization of processing and memory resources. For example, computer system 700 may provide support for executing one or more virtual machines. In certain embodiments, computer system 700 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 700. Accordingly, multiple operating systems may potentially be run concurrently by computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client devices via the Internet for receiving and sending information from and to the client devices. For example, the communication subsystem may be used to communicate with a database to execute a query to identify requestable entities.

Communication subsystem 724 may support both wired and/or wireless communication protocols. For example, in certain embodiments, communications subsystem 724 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

Communication subsystem 724 can receive and transmit data in various forms. For example, in some embodiments, in addition to other forms, communications subsystem 724 may receive input communications in the form of structured and/or unstructured data feeds 726, event streams 728, event updates 730, and the like. For example, communications subsystem 724 may be configured to receive (or send) data feeds 726 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 724 may be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to communicate data from computer system 700 to other computer systems or networks. The data may be communicated in various different forms such as structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
    receiving, by a dialog system, speech input from a user;
    processing, by the dialog system using a trained neural network, wherein the neural network has been trained to predict a likely domain based upon sample domain to utterance pairs, a first portion of the speech input to determine an initial discerned domain;
    responsive to determining the initial discerned domain and while receiving the speech input, causing display, by the dialog system, of a visual indication of the initial discerned domain, wherein the visual indication of the initial discerned domain comprises an image indicating the initial discerned domain, the initial discerned domain comprising a category corresponding to multiple intents; and
    processing, by the dialog system, a second portion of the speech input to determine a modified discerned domain, wherein the second portion of the speech input completes the first portion of the speech input and clarifies the initial discerned domain responsive to the visual indication of the initial discerned domain, wherein the modified discerned domain is different from the initial discerned domain, and wherein the first portion of speech input and the second portion of speech input are processed as a continuous stream of input.

2. The method of claim 1, wherein the dialog system processes the speech input substantially in real time.

3. The method of claim 1, further comprising executing, by the dialog system, a task corresponding to the modified discerned domain.

4. The method of claim 1, further comprising:
    determining, by the dialog system, a response based upon the modified discerned domain; and
    providing, by the dialog system, the response to the user.

5. The method of claim 1, wherein determining the initial discerned domain comprises:
    computing, by the dialog system, a plurality of scores for a respective plurality of potential domains and the first portion of the speech input; and
    determining, by the dialog system, that the score for a particular domain, of the plurality of potential domains, exceeds a threshold value, thereby setting the particular domain to the initial discerned domain,
    wherein causing display of the visual indication of the initial discerned domain is triggered by the determination that the score exceeds the threshold value.

6. The method of claim 1, wherein determining the initial discerned domain comprises:
- determining, by an automated speech recognition subsystem of the dialog system, a first text utterance corresponding to the first portion of the speech input;
- providing, by the automated speech recognition subsystem to a natural language understanding subsystem of the dialog system, the first text utterance; and
- determining, by the natural language understanding subsystem based upon the first text utterance, the initial discerned domain.

7. A non-transitory computer-readable memory storing a plurality of instructions executable by one or more processors, the plurality of instructions comprising instructions that when executed by the one or more processors cause the one or more processors to perform processing comprising:
- receiving speech input from a user;
- processing, using a trained neural network, wherein the neural network has been trained to predict a likely domain based upon sample domain to utterance pairs, a first portion of the speech input to determine an initial discerned domain;
- responsive to determining the initial discerned domain and while receiving the speech input, causing display of a visual indication of the initial discerned domain, wherein the visual indication of the initial discerned domain comprises an image indicating the initial discerned domain, the initial discerned domain comprising a category corresponding to multiple intents; and
- processing a second portion of the speech input to determine a modified discerned domain, wherein the second portion of the speech input completes the first portion of the speech input and clarifies the initial discerned domain responsive to the visual indication of the initial discerned domain, wherein the modified discerned domain is different from the initial discerned domain, and wherein the first portion of speech input and the second portion of speech input are processed as a continuous stream of input.

8. The non-transitory computer-readable memory of claim 7, wherein the speech input is processed substantially in real time.

9. The non-transitory computer-readable memory of claim 7, the processing further comprising executing a task corresponding to the modified discerned domain.

10. The non-transitory computer-readable memory of claim 7, the processing further comprising:
- determining a response based upon the modified discerned domain; and
- providing the response to the user.

11. The non-transitory computer-readable memory of claim 7, wherein determining the initial discerned domain comprises:
- computing a plurality of scores for a respective plurality of potential domains and the first portion of the speech input; and
- determining that the score for a particular domain, of the plurality of potential domains, exceeds a threshold value, thereby setting the particular domain to the initial discerned domain,
- wherein causing display of the visual indication of the initial discerned domain is triggered by the determination that the score exceeds the threshold value.

12. The non-transitory computer-readable memory of claim 7, wherein determining the initial discerned domain comprises:
- determining, by an automated speech recognition subsystem, a first text utterance corresponding to the first portion of the speech input;
- providing, by the automated speech recognition subsystem to a natural language understanding subsystem, the first text utterance; and
- determining, by the natural language understanding subsystem based upon the first text utterance, the initial discerned domain.

13. A system comprising:
- one or more processors;
- a memory coupled to the one or more processors, the memory storing a plurality of instructions executable by the one or more processors, the plurality of instructions comprising instructions that when executed by the one or more processors cause the one or more processors to perform processing comprising:
  - receiving speech input from a user;
  - processing, using a trained neural network, wherein the neural network has been trained to predict a likely domain based upon sample domain to utterance pairs, a first portion of the speech input to determine an initial discerned domain;
  - responsive to determining the initial discerned domain and while receiving the speech input, causing display of a visual indication of the initial discerned domain, wherein the visual indication of the initial discerned domain comprises an image indicating the initial discerned domain, the initial discerned domain comprising a category corresponding to multiple intents; and
  - processing a second portion of the speech input to determine a modified discerned domain, wherein the second portion of the speech input completes the first portion of the speech input and clarifies the initial discerned domain responsive to the visual indication of the initial discerned domain, wherein the modified discerned domain is different from the initial discerned domain, and wherein the first portion of speech input and the second portion of speech input are processed as a continuous stream of input.

14. The system of claim 13, wherein the speech input is processed substantially in real time.

15. The system of claim 13, the processing further comprising executing a task corresponding to the modified discerned domain.

16. The system of claim 13, the processing further comprising:
- determining a response based upon the modified discerned domain; and
- providing the response to the user.

17. The system of claim 13, wherein determining the initial discerned domain comprises:
- computing a plurality of scores for a respective plurality of potential domains and the first portion of the speech input; and
- determining that the score for the initial discerned domain exceeds a threshold value,
- wherein causing display of the visual indication of the initial discerned domain is triggered by the determination that the score for the initial discerned domain exceeds the threshold value.

* * * * *